3,048,125
CONVEYOR SYSTEMS
Arthur Thomas Charles Burrows, Stevenage, England, assignor to Geo. W. King Limited, Stevenage, England, a British company
Filed Nov. 4, 1960, Ser. No. 67,241
Claims priority, application Great Britain Nov. 5, 1959
7 Claims. (Cl. 104—172)

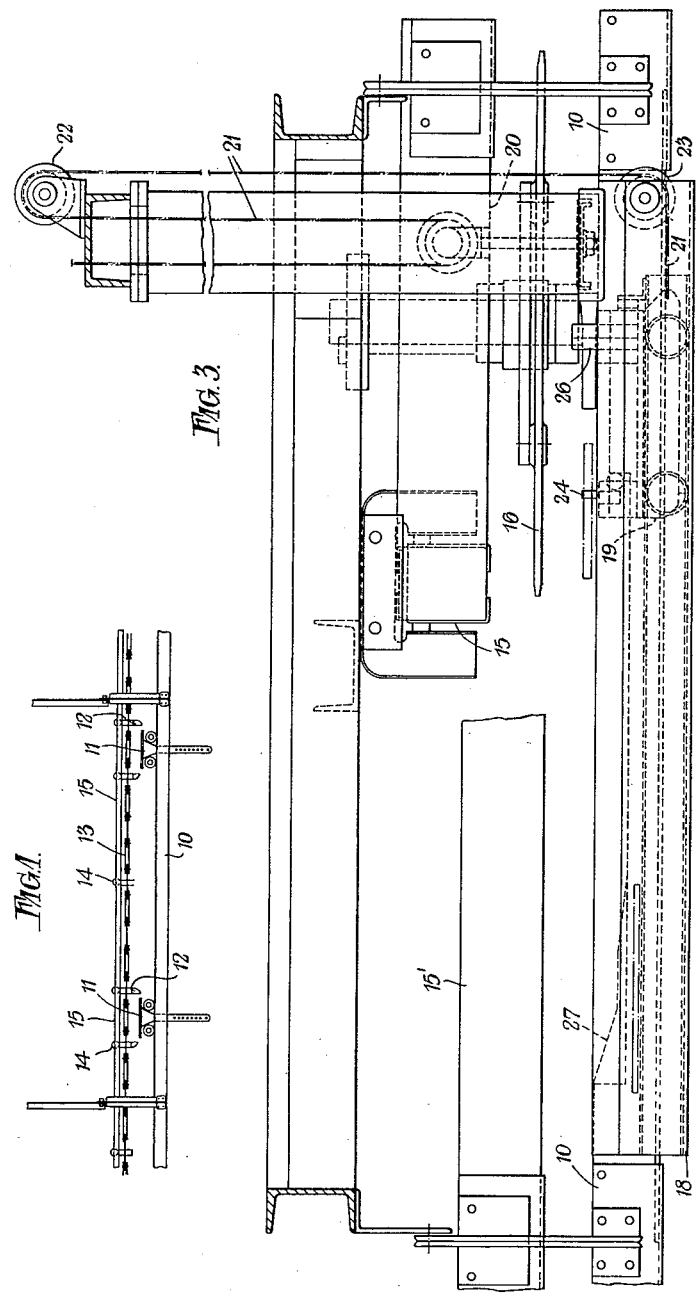

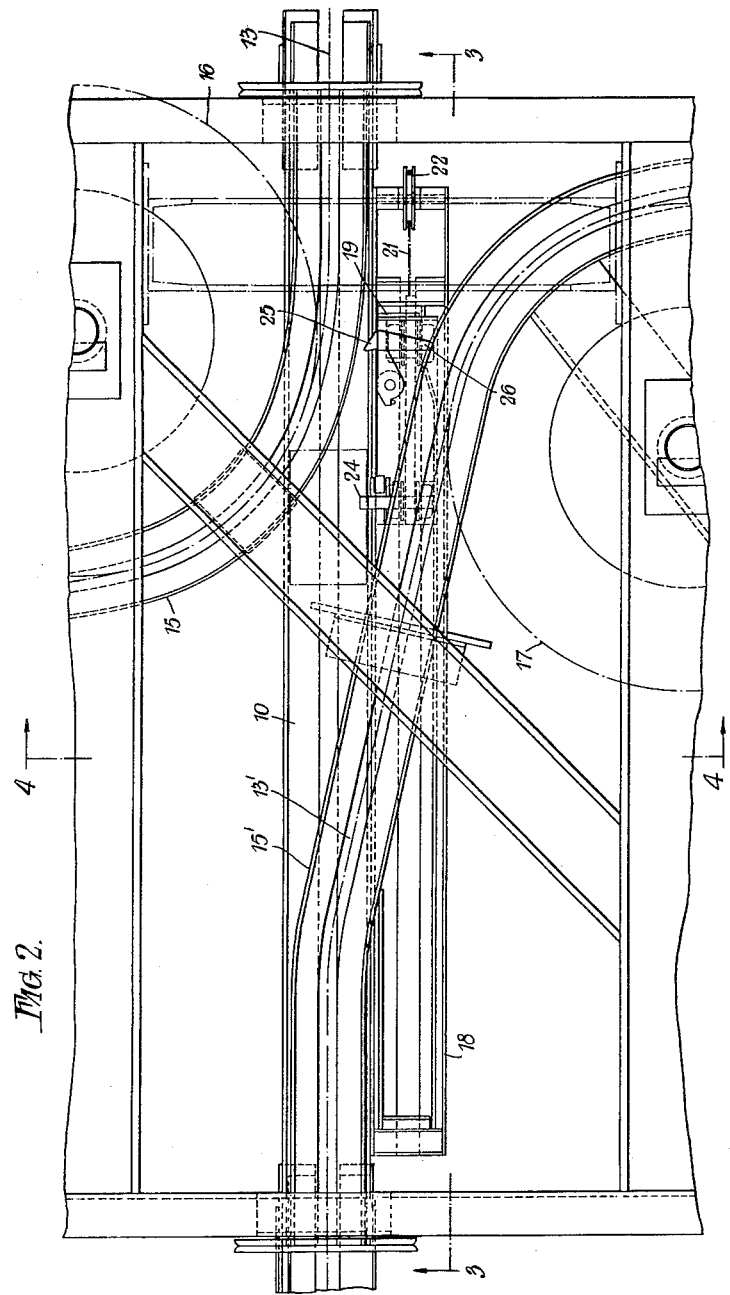

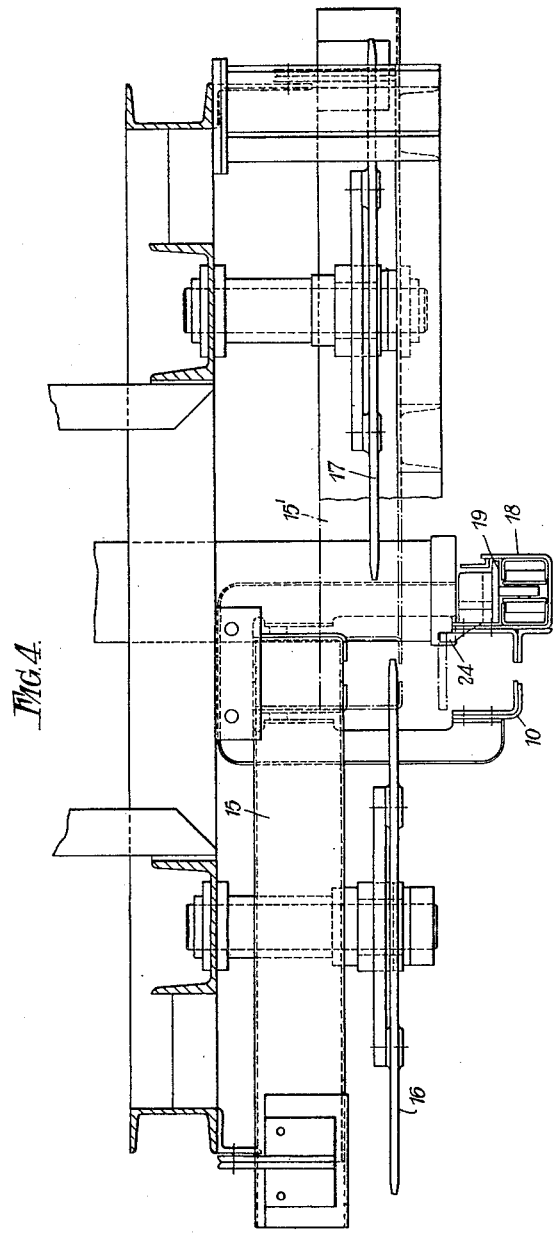

This invention relates to conveyor systems of the kind wherein load carrying trolleys are propelled along a fixed track by virtue of the engagement therewith of pusher dogs or abutments which depend from an endless driven chain travelling along a path above the fixed track.

According to the invention in a conveyor system of the kind set forth it is proposed to provide a first driven chain by means of which load carrying trolleys may be propelled along a portion of a track. Further provided is a second driven chain by means of which said trolleys may be propelled along ta further portion of the track. There is also provided means for effecting transfer between the load carrying trolleys and the first and second driven chains. Accordingly, a load trolley will be driven by the first driven chain along a portion of the track, the trolley thereafter being engaged by said means which advances the trolley into driving relation with the second driven chain whereby said trolley is then advanced along the further portion of the track by the second driven chain.

In order that the said invention may be clearly understood and readily carried into effect the same will be hereinafter more fully described with reference to the accompanying drawings in which:

FIGURE 1 is a diagrammatic side elevational view illustrating the type of conveyor with which the invention is concerned, FIGURE 2 is a plan view of a transfer zone and of the mechanism present thereat, FIGURES 3 and 4 are respectively sections on the line 3—3 and 4—4 of FIGURE 2.

The invention is concerned with a type of conveyor such as is illustrated in FIGURE 1 and referring now to that figure 10 denotes a fixed track along which load carrying trolleys 11 are adapted to run, the requisite movement being imparted to such trolleys by virtue of the engagement therewith of pusher dogs or abutments 12 which are associated with an endless driven chain 13. As will be seen the chain 13 is supported at spaced points along its length by hangers depending from so-called "chain trolleys" 14 which run on an upper track 15 disposed vertically above said track 10. Such conveyor systems are of course generally well known.

In the present case it is proposed to provide means whereby the drive to the load trolleys may be transferred from one endless chain to another and referring now to FIGURES 2–4, 10 again denotes the fixed track along which the load carrying trolleys are caused to travel while 15 and 15' denote the upper tracks on which the chain trolleys associated with the two endless driven chains are adapted to run. It will be clearly seen in FIGURE 2 that in the zone where the drive transfer is to be effected the chain serving to propel load trolleys to said zone and indicated at 13 is passed around a corner wheel 16 and is thus caused to diverge from the path of the fixed track 10. Also in the transfer zone the second chain which is indicated at 13' and the function of which is to propel the load trolleys from said zone and along track 10 is so arranged that at a selected point spaced forwardly of the point of divergence of the chain 13, the chain 13' will converge with respect to the fixed track 10 and be caused to assume a position wherein it is vertically above said fixed track 10 and is thereafter effective to impart a drive to the load trolleys. 17 denotes a corner wheel around which the second chain 13' passes. Chain 13 imparts a drive to the load trolleys after they leave the transfer zone, the trolleys remaining in track 10.

In the transfer zone a secondary track 18 is provided which extends alongside the fixed track 10 parallel thereto and substantially at the same level thereas. The secondary track 18 serves to support a trolley 19 hereinafter termed the "transfer trolley" which is normally maintained in a retracted position by means of a balance weight or the like 20 such weight being carried by a rope or cable 21 which passes around appropriate sheaves or pulleys 22, 23 and is attached to the transfer trolley. The transfer trolley 19 carries towards its forward end a laterally directed arm or projection 24 which is adapted to project across the fixed track 10 into the path of any load carrying trolley passing along the latter. The arm or projection 24 is capable of being swung upwardly or downwardly from or into its operative position but there is no possibility of forward or rearward pivotal movement in the direction of travel of the load trolleys. In other words when in its operative position the arm or projection 24 will constitute a rigid stop for any load carrying trolley. Towards its rearward end the transfer trolley carries a second arm or projection 25 adapted also to project across the fixed track 10 said second arm or projection being so mounted that while it may be swung idly forwardly by any load trolley to allow forward passage of the latter it will constitute a rigid stop to prevent rearward movement of said load trolley once the latter has passed it. Also at its rearward end the transfer trolley is provided with an abutment 26 with which the driving dogs or abutments on the second chain 13' are adapted to cooperate as will be hereinafter more fully described. 27 denotes a fixed ramp or like surface which is disposed at the end of the path of travel of the transfer trolley 19 to cooperate with the arm or projection 24 as will be hereinafter described.

The apparatus above described is adapted to operate in the following manner:

A load carrying trolley propelled from right to left in the drawings along the fixed track 10 by a pusher dog or abutment on the first drive chain 13 will on reaching the transfer zone pass the second arm or projection 25 at the rear end of the transfer trolley and will eventually be caused to abut the first arm or projection 24 which constitutes a rigid stop. At this stage the load trolley will still be propelled forwardly by the pusher dog or abutment on the first chain 13 so that the transfer trolley 19 will also then be moved forwardly against the action of its balance weight 20. The arrangement is such that as the first drive chain 13 diverges from the path of the fixed track 10 and the pusher dog or abutment hitherto in engagement with the load carrying trolley moves laterally out of contact with the latter, the transfer trolley 19 will have been pushed forwardly to a position wherein a pusher dog or abutment on the second chain 13' will engage the abutment 26 at the rear of said transfer trolley. Thus the transfer trolley 19 will then be moved forwardly by the second chain 13'. The load trolley will continue to travel with the transfer trolley 19 by virtue of the fact that it is located between the two arms or projections 24, 25 carried by the latter, the second or rearward arm or projection 25 constituting a fixed stop which prevents rearward movement of said load carrying trolley relative to said transfer trolley 19. As the second chain 13' converges with respect to the fixed track 10 the pusher dog or abutment thereon which is in engagement with the abutment on the transfer trolley 19 will move into a position wherein it will engage behind the load carrying trolley then moving with said transfer trolley. The arrangement is such that as the pusher dog or abutment on the second chain 13' moves into position behind the load carrying trolley the first arm or projection 24 on the transfer trolley will cooperate with the ramp or like surface 27 which will be effective to lift the same upwardly out of the path of the load trolley which will then be free to travel forwardly propelled by the pusher dog or abutment on the second chain 13'. When the first arm or projection 24 is swung upwardly clear of the load trolley the balance weight 20 associated with the transfer trolley 19 will be effective to return the latter to its initial position in readiness for a further operation, it being appreciated that the first arm or projection 24 once retracted clear of the ramp or the like 27 will return to its initial or operative position wherein it will be contacted by the next following load trolley. It will also be appreciated that when the transfer trolley 19 is in its rearward or retracted position it will be clear of the dogs or abutments on the second drive chain 13' which will continue to travel freely, said transfer trolley 19 only being adapted to be engaged by a pusher dog or abutment on the second chain 13' after the transfer trolley has been moved forwardly by a predetermined amount.

It may be pointed out that the two driven chains 13, 13' may be driven at different speeds and that the arrangement may be such that the load carrying trolleys will remain stationary for a period after disengagement from the pusher dog or abutment on the first chain 13. Furthermore the pusher dogs or abutments on the first driven chain 13 may be at a different pitch from those on the second driven chain 13' but it will be appreciated however that the frequency of passage of the dogs or abutments on the second chain should be at least as great as that of the dogs or abutments on the first chain.

What is claimed is:

1. A conveyor system comprising a track, a trolley on said track and movable therealong, first means for driving the trolley along a portion of the track and second means for driving the trolley along a further portion of the track and means for effecting transfer between the trolley and the first and second said means comprising transfer means engaging said trolley with the same in driving relation with the first said means, the transfer means being advanced to a position wherein it is engaged by the second means in driving relation, the trolley being disconnected from the first means with said transfer means in said position, the second means driving said transfer means and the trolley engaged therewith to a further position, and means at said further position for moving said transfer means out of driving engagement with the trolley, the trolley at said further position being engaged by said second means in driving relation for advancement along said track.

2. A conveyor system as claimed in claim 1 comprising means resisting displacement of said transfer means by the second means and returning said transfer means to its original position with said transfer means at said further position and out of engagement with the second means.

3. A conveyor system as claimed in claim 1 wherein the means for effecting transfer between the trolley and the first and second said means comprises a second track parallel to the first said track, said transfer means comprising a second trolley movably supported on said second track and an abutment on said second trolley extending over the first track for engaging said first trolley in driving relation.

4. A conveyor system as claimed in claim 3 wherein the first and second means each include a chain and pusher dogs extending from said chain, the path of the chain of the second means being inclined with respect to said first and second tracks, the dogs on the chain of the second means, first engaging the second trolley to drive the same and with said trolley in said further position disengaging from said second trolley and engaging said first trolley in driving relation.

5. A conveyor system as claimed in claim 4 wherein the means at said further position comprises ramp on said second track for elevating said abutment out of engagement with the first trolley.

6. A conveyor system as claimed in claim 3 wherein said abutment is fixedly supported on said second trolley and extends over said first track, said first trolley driving the second trolley with the first trolley in contact with said abutment.

7. A conveyor system as claimed in claim 6 comprising a second abutment pivotally supported on said second trolley for pivoting in one direction only, the first said trolley first pivoting said second abutment and moving therepast to engage the first said abutment as said first trolley traverses said first track, the second abutment returning to its original position over the first track to resist reverse movement of said first trolley.

References Cited in the file of this patent
UNITED STATES PATENTS

| | | |
|---|---|---|
| 761,484 | Hetzel | May 31, 1904 |
| 931,863 | Haight | Aug. 24, 1909 |
| 2,875,704 | Yates | Mar. 3, 1959 |
| 2,918,021 | Burrows | Dec. 22, 1959 |